United States Patent [19]

Tokuda

[11] Patent Number: 4,512,643

[45] Date of Patent: Apr. 23, 1985

[54] EXPOSURE CONTROL DEVICE FOR CAMERA

[75] Inventor: Ryuji Tokuda, Tokyo, Japan

[73] Assignee: Canon Kabushiki Kaisha, Tokyo, Japan

[21] Appl. No.: 583,754

[22] Filed: Feb. 27, 1984

[30] Foreign Application Priority Data

Mar. 2, 1983 [JP] Japan .................................. 58-34171

[51] Int. Cl.³ ........................ G03B 7/083; G03B 7/24
[52] U.S. Cl. ...................................... 354/21; 354/427; 354/428; 354/464
[58] Field of Search .......................... 354/21, 425–428, 354/459, 464

[56] References Cited

U.S. PATENT DOCUMENTS

4,037,234  7/1977  Tunekawa et al. .............. 354/464 X
4,072,961  2/1978  Yamada .......................... 354/459 X
4,181,413  1/1980  Kawasaki et al. ............. 354/459 X
4,200,371  4/1980  Suzuki et al. ......................... 354/21
4,459,574  7/1984  Tokuda ........................... 354/464 X Primary Examiner—William B. Perkey
Attorney, Agent, or Firm—Toren, McGeady and Stanger

[57] ABSTRACT

An exposure control device for a camera wherein a current produced from a light sensitive element in proportion to the quantity of light incident on the element is logarithmically suppressed. A suppressed voltage obtained from this current to which voltage is added a voltage which is substantially proportional to absolute temperature and is produced according to encoded film sensitivity information expressed in the APEX system. The voltage resulting from the addition is converted into a current and expanded. The degree of an exposure is controlled on the basis of the expanded current.

9 Claims, 7 Drawing Figures

EXPOSURE CONTROL DEVICE FOR CAMERA

BACKGROUND OF THE INVENTION

1. Field of the Invention

This invention relates to an automatic exposure control circuit for a photographic camera or the like and, more particularly, to an arrangement for including information on film sensitivity in an exposure control signal.

2. Description of the Prior Art

Heretofore, a camera of the kind having a so-called half-opening shutter in which the shutter blades are arranged to serve combined functions as a diaphragm and a shutter and in which an exposure control program is determined by a shutter opening time. Such cameras have been arranged in general to have film sensitivity information supplied to a light measurement computing circuit in an optical manner with a filter or aperture set in front of a light sensitive element in such a way as to correspond to the film sensitivity information set by the photographer. Known electrical methods for supplying the film sensitivity information have been as follows: When a photo conductive cell, such as a CdS cell is used as the light sensitive element, the film sensitivity information is supplied by shifting resistance, in the case of a camera using a photo diode and suppressing and which utilizes expanding a current produced therefrom, the film sensitivity information is supplied by shifting the voltage determining level of a capacitor which is arranged to be charged with an expanded current thus obtained. However, the film sensitivity information values are widely distributed. In order to cover all the film sensitivity values of the ISO system, many indexing steps are necessary. Arrangement to electrically shift such wide-ranged film sensitivity information at an increment or decrement of $\frac{1}{3}$ step then results in an increased number of parts or in a voltage varying range broadened by $2^n$ times (n: the number of steps of film sensitivity information) this results in increased size of the apparatus or a complex circuit.

The automation of the design of cameras has advanced year by year. In the case of the so-called lens-shutter camera, it is now only the arrangement for setting the film sensitivity which remains not automated. To attain this automation, the above-stated optical information supplying method necessitates a complex structural arrangement. Therefore, it has been thus desired to have a compact circuit which is capable of processing an electrical input and giving accurate exposure information against temperature fluctuations. There has also appeared a film cartridge of the kind arranged to be capable of indexing all of the 24 different film sensitivity values of the ISO sensitivity system by means of a five-place indexing part as disclosed in Japanese Patent Application Laid-Open No. SHO 57-104129.

SUMMARY OF THE INVENTION

It is an object of the present invention to provide an exposure control device which is arranged to use a film cartridge of the above-stated kind to automatically receive the film sensitivity information indexed thereon at an exposure control circuit and is capable of accurately performing temperature compensated exposure control with a compact circuit arrangement.

It is another object of the invention to provide an exposure control device which is capable of discriminating the kind of a film cartridge to be used and, if the film cartridge loaded on the camera is not provided with an encoded film sensitivity information index, is also capable of informing the photographer of that fact.

These and further objects and features of the invention will become apparent from the following detailed description of preferred embodiments thereof taken in connection with the accompanying drawings.

DETAILED DESCRIPTION OF THE PREFERRED EMBODIMENTS

Figures 1, 2:
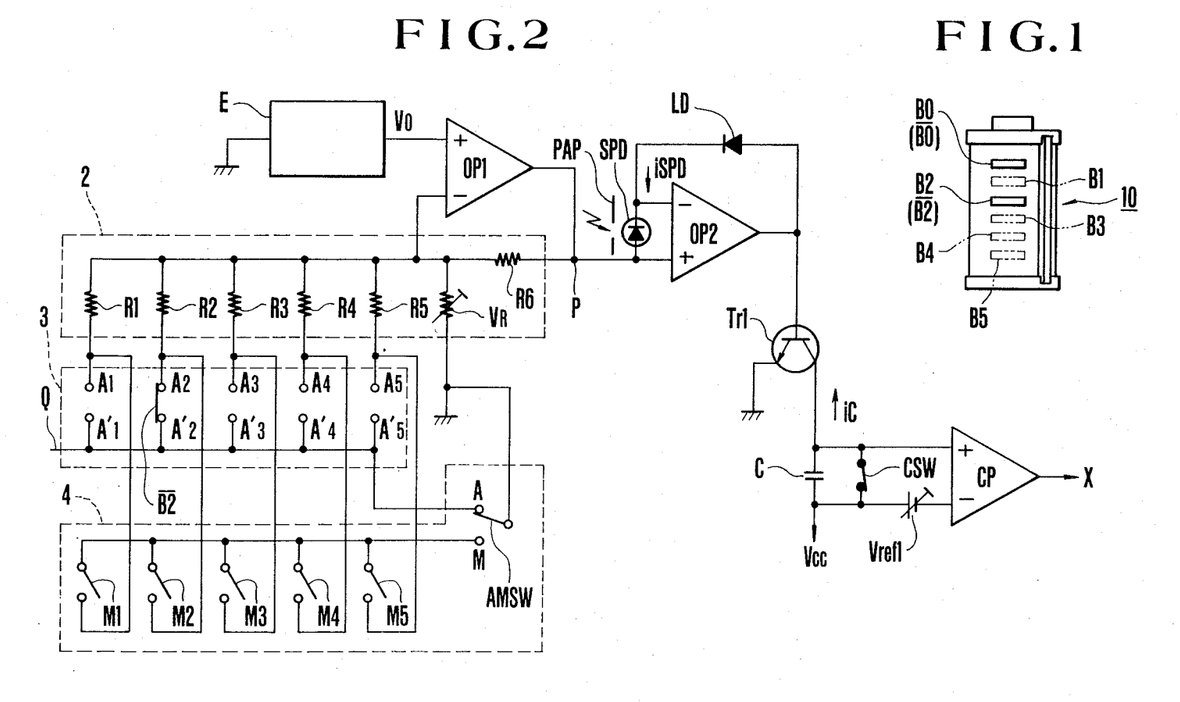
FIG. 1 is a front view showing a film cartridge.
FIG. 2 is a circuit diagram showing an automatic exposure control circuit to which the present invention is applied.

FIG. 1 shows a film cartridge arranged to produce encoded film sensitivity information of logarithmic expression in the APEX system to an automatic exposure control circuit arranged according to the present invention. On one insulator side of the film cartridge 10, are separately arranged rectangular electrode positions B1, B2, B3, B4 and B5. A conductive electrode is applied to each of points which are indicated by marks in the Table and are arranged in the above-stated electrode positions B1, B2, B3, B4 and B5 according to film sensitivity. Another electrode position B0 is provided for film of all kinds irrespective of the film sensitivity.

The fundamental arrangement of the code system mentioned above is as follows: The value indication of the ISO sensitivity is reduced to $25 \times 2^n$ wherein "n" represents the number of steps. With respect to "n", 3-bit binary codes are obtained with the third (B3) of the places of the electrode positions B1–B3 representing the most significant place and the first (B1) the least significant place among the electrode positions. Meanwhile, the fourth and fifth places respectively represent $\frac{1}{3}$ step and $\frac{2}{3}$ step of the film sensitivity.

For example, an ISO sensitivity value index 100 (corresponds to the ASA sensitivity index) can be reduced to $25 \times 2^2$. In this instance, since the step number indication is 2, a conductive coating material is applied solely to an electrode located in the position B2. An ISO sensitivity value indication 1000 can be reduced to $25 \times 2^{5-\frac{1}{3}}$ and its step number indication is $5\frac{1}{3}$. In that instance, the conductive coating material is applied to three electrodes located in the position B1 (corresponding to step number 1), the position B3 (corresponding to step number 4) and the position B4 (corresponding to step number $\frac{1}{3}$) to obtain the sum of the three corresponding step numbers $5\frac{1}{3}$.

When the camera is loaded with such a film cartridge 10, the contacts of an automatic switch located in a position where the electrode corresponding thereto is coated with the conductive coating material become conductive. In the case of the film cartridge of ISO sensitivity index 100, an electrode $\overline{B}2$ is formed in the position B2 as shown in FIG. 1. With this cartridge 10 loaded on the camera, this electrode $\overline{B}2$ comes to render contacts A2 and A2' of the automatic switch of the camera conductive as shown in FIG. 2. The above-stated arrangement may be replaced with another method of arrangement in which; instead of forming electrodes directly in the positions B1-B5, some light reflecting substance is applied to these positions B1-B5 as applicable and the contacts A1·A1'-A5·A5' are operated as applicable by means of an electrical signal produced from a photo-electric element arranged to operate by detecting the intensity of light reflected by the substance.

Figure 3:
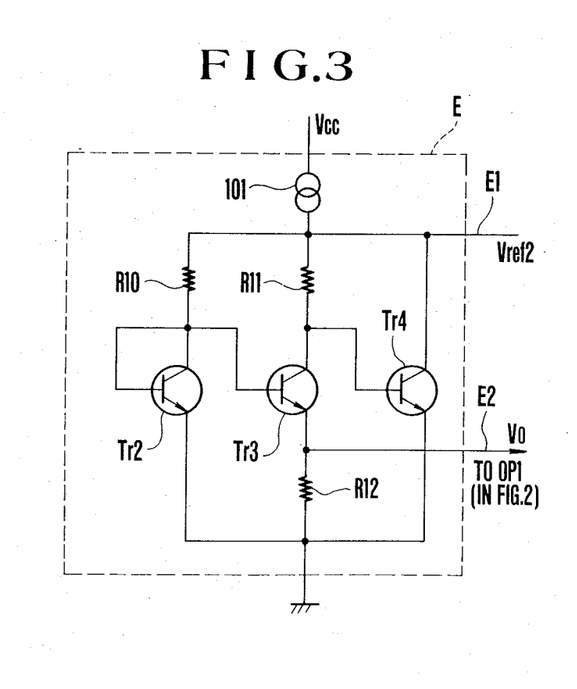
FIG. 3 is a circuit diagram showing a voltage generating circuit arranged to produce a voltage in proportion to absolute temperature.

FIG. 2 is a circuit diagram of an automatic exposure control device arranged as an embodiment of the invention. Referring to FIG. 2, the embodiment includes a silicon photo diode SPD which is arranged to convert light coming from an object to be photographed to a photo current. This diode SPD is disposed outside of the optical path of a taking lens (not shown). A transistor Tr1 is arranged to expand the photo current which has been logarithmically suppressed. Operational amplifiers OP1 and OP2 are known amplifiers of high input impedance. The circuit arrangement includes a comparator CP; a DC power source E; a reference voltage source Vref1; a capacitor C for expansion; resistors R1-R6 for D/A conversion; a semi-fixed resistor VR; a change-over switch AMSW which is connected to one contact A when such a cartridge 10 as shown in FIG. 1 is used and to another contact M when an ordinary film cartridge is used; contacts A1·A1'-A5·A5'; a count switch CSW which is arranged to open when shutter blades (not shown) open; A PAP is placed in front of the SPD; and a so-called auxiliary stop which is arranged to operate in association with the movement of the shutter blades. A power source voltage Vcc is supplied to this circuit by means of a switch (not shown) which is arranged to operate in response to the first stroke of operation on a shutter button (not shown). With the power source voltage Vcc supplied, the integrating capacitor C is charged with a current produced in proportion to the illumination intensity of light incident on the light sensitive element SPD. A shutter time is defined by the period of time elapsed before the charge level of the capacitor C reaches a predetermined level. This circuit diagram omits from illustration other functioning circuits that are required for a camera but can be added in a known manner, such as a low brightness warning circuit, a battery check circuit, a sequence control circuit, etc. The part between the base and emitter of the above-stated transistor Tr1 is arranged to have the same characteristic as the characteristic of a diode LD which will be described later herein. FIG. 3 is a circuit diagram showing by way of example the details of the above-stated DC power source E, which is a voltage generating circuit arranged to generate a voltage in proportion to absolute temperature. This circuit is known from Japanese Patent Application Laid-Open No. SHO 57-197622. Referring to FIG. 3, this circuit includes npn transistor Tr2-Tr4; resistors R10-R12; and a current source 101. With a current obtained from the voltage Vcc, a reference voltage Vref2 which is stable against temperature related to the band gap energy of silicon is obtained from the output E1 of the circuit E while a voltage Vo which is proportional to absolute temperature is obtained from another output E2.

The automatic exposure control circuit arranged as shown in FIG. 2 operates in the following manner: Let us assume that the position of the change-over switch AMSW is on the automatic side A thereof and the film cartridge 10 is provided with the conductive electrode $\overline{B}2$ representing the film sensitivity ISO 100 in the pattern encoded in accordance with Table. Under this condition, the contact part 3 of the camera arranged to contact with the film cartridge 10 has only the contacts A2 and A2' in a closed state among its five pairs of contacts A1 and A1', ..., A5 and A5' as the contacts A2 and A2' are in a position to come in contact with the electrode $\overline{B}2$. A resistance network 2 which is preferably formed on one and the same substrate with a printed resistance material includes resistors R1-R6. These resistors R1-R6 are arranged to be of values r, (½)r, (¼)r, 3r, (3/2)r and r. A semi-fixed resistor VR is arranged to adjust the whole exposure level by absorbing variations in the sensitivity of the light sensitive element, the time constant capacitor C, etc. and is arranged to have, for example, a value of (1/7)r. The non-inversion terminal of the operational amplifier OP1 is arranged to receive from the terminal E2 of the power source E to voltage Vo which is proportional to absolute temperature and is of a value (kT/q) ln 2 corresponding to a difference arising in forward voltage when the current of the diode increases by two times. In the above-stated value (kT/q) ln 2, "k" represents a Boltzmann's constant; "T" represents the absolute temperature; "q" represents the electric charge of one electron; and "ln" represents natural logarithm. In this case, the operational amplifier OP1 is reversely fed back by means of the negative feedback resistor R6. Therefore, the voltages of the two input terminals of the operational amplifier OP1 are equal to each other and thus the voltage of the inversion input terminal also becomes (kT/q) ln 2. The voltage (kT/q) ln 2 is applied to one end of the resistor R2 while the other end of the resistor R2 is grounded via the change-over switch AMSW as the contacts A2 and A2' are closed. Therefore, a flowing current becomes:

$$(kT/q) \ln 2/(\tfrac{1}{2})r = 2(kT/qr)/\ln 2 = 2I$$

wherein $I \equiv (kT/qr) \ln 2$.

Further, to the semi-fixed resistor VR is flowing a current:

$$(kT/q) \ln 2/(1/7)r = 7I.$$

Therefore, a current 2I+7I=9I flows to the resistor R6. As a result of that, the output voltage of the operational amplifier OP1 becomes as shown below:
(inversion input terminal voltage of OP1)
+(resistance value of resistor R1)
×9I=(kT/q) ln 2+r×9(kT/qr) ln 2=10×(kT/q) ln 2.

The way in which the output voltage of the operational amplifier OP1 is determined remains the same also in the cases of other ISO film sensitivity values. When contacts A1 and A1' close, the output voltage increases by (kT/q) ln 2. When contacts A3 and A3' close, it increases by 4×(kT/q) ln 2. When contacts A4 and A4' close, it increases by (⅓)×(kT/q) ln 2. With contacts A5 and A5' closed, it increases by (⅔)×(kT/q)

ln 2. Accordingly, the output voltage of the operational amplifier OP1 becomes a value determined by adding the step number (of ISO film sensitivity expressed with ISO 25 considered to be 0)×(kT/q) ln 2 to a basic bias value of 8×(kT/q) ln 2 which is determined by the value of the semi-fixed resistor VR and the potential of the inversion input terminal of the operational amplifier OP1. Let us now assume that a light flux comes through the auxiliary stop PAP to the light sensitive element SPD and this results in a flow of current iSPD. Then, in the case of ISO 100, the output voltage of the operational amplifier OP2 becomes as follows and is logarithmically suppressed:

$$10\times(kT/q)\ln 2 + (kT/q)\ln(iSPD/io)$$

wherein "io" represents a reverse saturation current of the logarithmic suppression diode LD.

Assuming that an expansion current flowing through the expansion transistor Tr1 is ic, if the current amplification degree hfe thereof is large, the current ic can be considered equal to the emitter current of the transistor. In this instance, the base potential of the transistor Tr1 is (kT/q) ln (ic/io), wherein "io" represents the reverse saturation current of the base-emitter junction of the transistor Tr1, which can be considered equal to that of the above-stated diode LD. This must be equal to the output voltage of the above-stated operational amplifier OP2. Therefore, there obtains the following relation:

$$10\times(kT/q)\ln 2 + (kT/q)\ln(iSPD/io) = (kT/q)\ln(ic/io).$$

This can be changed as follows:

$$(kT/q)\ln 2^{10} = (kT/q)\ln(ic/iSPD)$$

from which the following can be obtained: $ic = 2^{10} \cdot iSPD$.

The current ic does not contain the term of T and io which is dependent on temperature and is obtained by increasing iSPD by $2^{10} = 1024$ times, that is, the current ic is amplified by 10 steps. Then, generic expression of this becomes as follows. In the case of this circuit, in accordance with the step number index n of film sensitivity which is expressed logarithmically (or stepwise) with ISO 25 assumed to be 0, the expansion current becomes:

$$ic = 2^{(8+n)} \cdot iSPD.$$

Thus, the expanded current ic can be stably obtained according to the film sensitivity without depending on temperature. When the shutter blades open following a shutter release operation of the camera, the count switch CSW which has been in a closed state comes to open in synchronism with the opening operation of the shutter blades. With the count switch CSW opened, the time constant capacitor C begins to be charged with the expanded current ic. After the lapse of a period of time t, the potential of both terminals of the capacitor C reaches the reference voltage Vref1. The output of the comparator CP is then inverted to form a shutter closing signal. At this time, the following relation obtains:

$$ic \times t = c \times Vref1,$$

wherein "c" represents the capacity value of the time constant capacitor C. This formula then can be changed as follows:

$$t = (c \times Vref1)/(2^{8+n} \times iSPD).$$

The shutter time t is inversely proportional to the photo-galvanic current iSPD, i.e. the brightness of an object to be photographed, and is also in inverse proportion to the film sensitivity, so that an adequate exposure can be effected.

Thus, in accordance with the present invention, a wide range of film sensitivity information values can be automatically and accurately set in a photo-metric computation circuit with a photo-galvanic element used and with suppression and expansion carried out. In addition to that, the invention also permits temperature compensation without recourse to use of any special resistance element for obtaining the temperature compensating function. The invention is highly suited for use of an integrated circuit. It is another advantage of the invention that, in the case of an integrated circuit, the number of pins required for the integrated circuit can be minimized.

Further, the contacts M1-M5 which are arranged on the manual operation side and included in the film sensitivity manual setting part 4 of FIG. 2 are arranged respectively in parallel with the contacts on the automatic operation side A1 and A1'-A5 and A5'. When the switch AMSW is shifted to the manual operation side M, these contacts M1-M5 permit manual setting of film sensitivity values. In that instance, the resistors R1-R6 and VR can be used in common with the automatic setting operation. This ensures that no difference will arise between automatic and manual setting operations. With the embodiment arranged in this manner, a preference can be afforded to manual setting even with the camera loaded with an automatic setting film cartridge 10. Then, exposure adjustment also can be accomplished through the manual setting operation.

In the case of this embodiment, the voltage generating circuit E which produces a voltage in proportion in absolute temperature is arranged to produce an output (kT/q) ln 2 by taking out a difference in the voltage between the base and emitter of a pair of transistors which are arranged to increase current density by two times. However, the invention is not limited to this method. This method can be replaced with any other suitable known method. Further, the output value is not limited to (kT/q) ln 2 but can be of any other value that is proportional to absolute temperature. Variations in absolute value can be readily dealt with by changing the resistance values within the resistance network 2.

Figure 4:
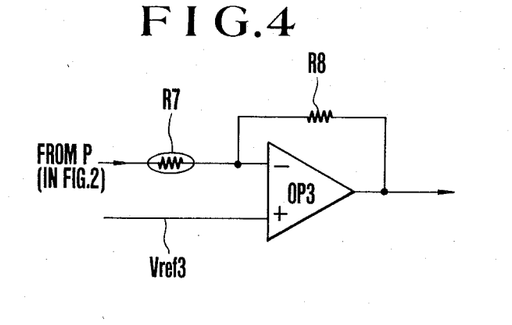
FIG. 4 is a circuit diagram showing a temperature coefficient cancel circuit.
Figure 5:
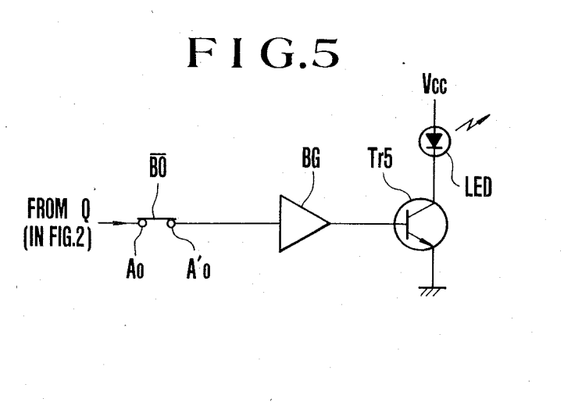
FIG. 5 is a circuit diagram showing a warning display circuit.

FIGS. 4 and 5 show circuits which can be added to the circuit shown in FIG. 2 as necessary. The circuit of FIG. 4 comprises a resistor R7 which has a temperature characteristic proportional to absolute temperature; an operational amplifier OP3 and a resistor R8. This circuit is arranged to cancel a temperature coefficient from the output P of the operational amplifier OP1 of FIG. 2.

The output P of the operational amplifier OP1 contains therein the film sensitivity information which is manually or automatically set. Therefore, the output P can be used as analog information for other purposes, such as an ISO sensitivity display or computation to be carried out for flash photography. In FIG. 4, a reference symbol Vref3 denotes a reference voltage.

The circuit of FIG. 5 is a warning display circuit arranged to give a warning when the contacts A0 and A0' are rendered conductive by the common electrode $\overline{B0}$ of the film cartridge 10 (see FIG. 1). In the event that the predetermined encoded film sensitivity index is not on the film cartridge 10 and the contacts A0 and A0' do not become conductive although the automatic/manual film sensitivity setting change-over switch AMSW is shifted to the automatic side A, that is, when the camera is loaded with an ordinary film cartridge, the circuit detects it and gives a warning to the operator of the camera with a light emitting diode LED caused to light up by a buffer gate BG and a transistor Tr5. Further, when the switch AMSW is shifted to the manual side M, the contact A0 is in an electrically open state. In that event, therefore, the diode LED lights up to show that the switch AMSW is connected to the manual side M. This circuit can be arranged either to have the lighting time restricted by a sequence control circuit provided within the camera or to perform an additional function as a battery check display circuit in conjunction with a power source voltage detection circuit (not shown).

In the embodiment described above, the reference level used for computation is always arranged to be the ground and the circuit is arranged to carry out exponential expansion immediately after the logarithmic suppression. However, in accordance with the invention, the reference level can be arranged to be some intermediate potential and some other computation or correction element may be inserted in between the logarithmic suppression and the exponential expansion.

Figure 6:
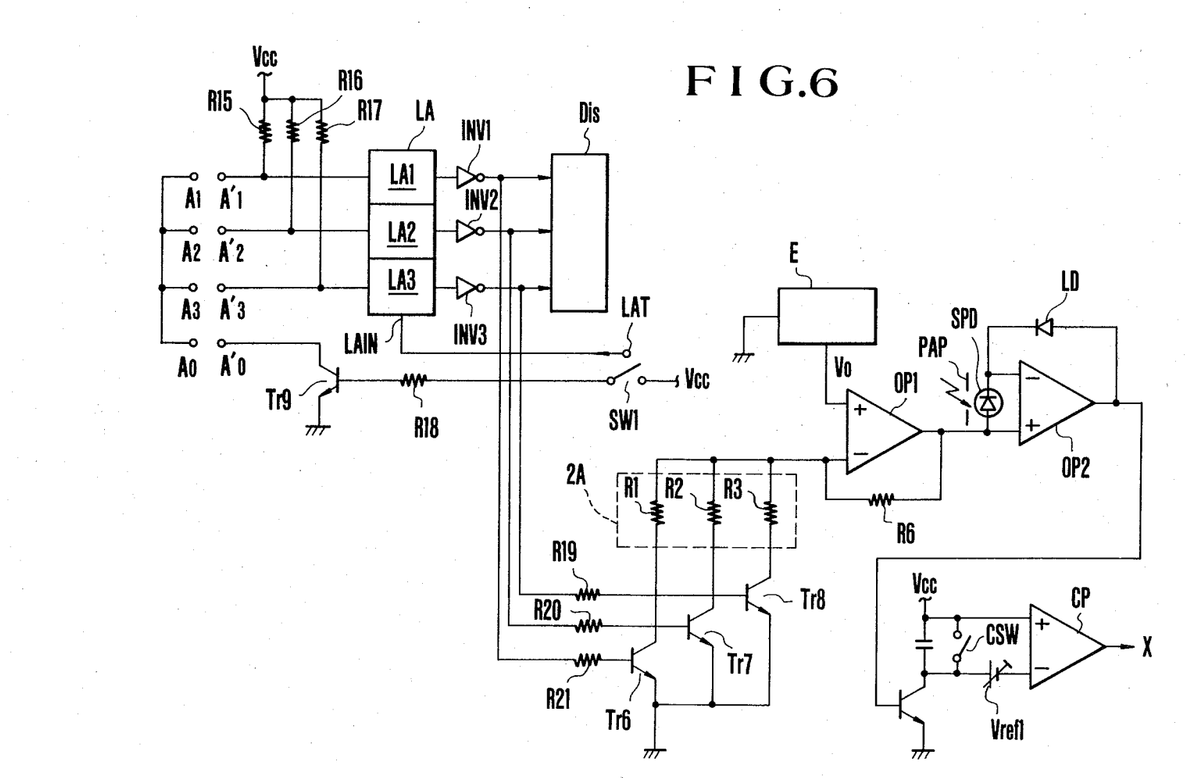
FIG. 6 is a circuit diagram showing an exposure control device of a camera arranged according to the present invention as another embodiment thereof.

FIG. 6 shows another embodiment of the invention. In this case, the digital film sensitivity information read out from the film cartridge 10 of FIG. 1 is supplied via a resistor to a resistance network 2A which forms a D/A converter.

The circuit diagram of FIG. 6 includes a 3-bit latch circuit LA. In the latch circuit LA, a first bit part LA1 is connected to contacts A1 and A1' which are similar to the contacts of FIG. 2. A second bit part LA2 is connected to contacts A2 and A2' which are similar to those of FIG. 2. A third bit part LA3 is connected to contacts A3 and A3' which are also similar to those shown in FIG. 2. Further, these bit parts LA1–LA3 of the latch circuit LA are also connected to the bases of transistors Tr6–Tr8 via inverters INV1–INV3 and base resistors R19–R21. The latch circuit LA is provided with an input terminal LAIN which is arranged to receive from a terminal LAT a latching signal for determining a latching time. A transistor Tr9 has its collector connected via common contacts A0 and A0' to the above-stated contacts A1–A3. When a shutter button (not shown) is depressed to a first stroke position thereof, a switch SW1 closes and supplies a high level signal to the base of the transistor Tr9. Resistors R1–R3 are arranged to have the same resistance values as those of the resistors R1–R3 of FIG. 2. A resistor R6 is also arranged to have the same resistance value as the resistor R6 of FIG. 2. For the sake of simplification of illustration, FIG. 6 omits the resistors R4 and R5 and the contacts A4, A4', A5 and A5' of FIG. 2. Meanwhile, the elements performing the same functions as the corresponding elements of FIG. 2 are indicated by the same reference numerals and symbols and description of them is omitted here. The exposure control device which is arranged as shown in FIG. 6 operates as follows:

With the camera loaded with the film cartridge 10 shown in FIG. 1, the electrode $\overline{B0}$ (see FIG. 1) causes the contacts A0 and A0' to become conductive. Assuming that the film sensitivity in this instance is ISO 800, for example, the electrodes $\overline{B1}$ and $\overline{B3}$ render the pairs of contacts A1 and A1' and A3 and A3' conductive. A current flows via the transistor Tr9 to the resistors R15 and R17. Further, let us assume that the shutter button (not shown) has already been depressed and a high level voltage has been impressed via the switch SW1 and the resistor R18 on the transistor Tr9. Then, the input levels of the input terminals of the first and third bit parts LA1 and LA3 of the latch circuit LA are low. The latch circuit LA, therefore, comes to latch an input signal in response to a latching signal supplied from the terminal LAT after the transistor Tr9 turns on. The latch circuit LA then generates a digital signal corresponding to the film sensitivity information provided on the film cartridge 10. Since the film sensitivity in this particular instance is ISO 800 as mentioned above, the output levels of the inverters INV1 and INV3 become high. As a result of this, the transistors Tr6 and Tr8 turn on. Accordingly, the output terminal of the operational amplifier OP1 produces a voltage corresponding to the film sensitivity value in the same manner as mentioned in the description of the preceding embodiment of FIG. 2.

The rest of the operation of the embodiment is similar to that of the preceding embodiment shown in FIG. 2.

The foregoing description of embodiments shown in FIGS. 2 and 6 is based on the assumption that a taking lens (not shown) is of a fixed focal length. Whereas, in some of photographic cameras, the taking lens has a variable focal length. In case that the camera is of such a kind and that the light sensitive element SPD is not arranged to detect the intensity of light passed through the taking lens, it is impossible to obtain an adequate exposure as the maximum F-number value of the taking lens changes when the focal length of the lens varies.

Figure 7:
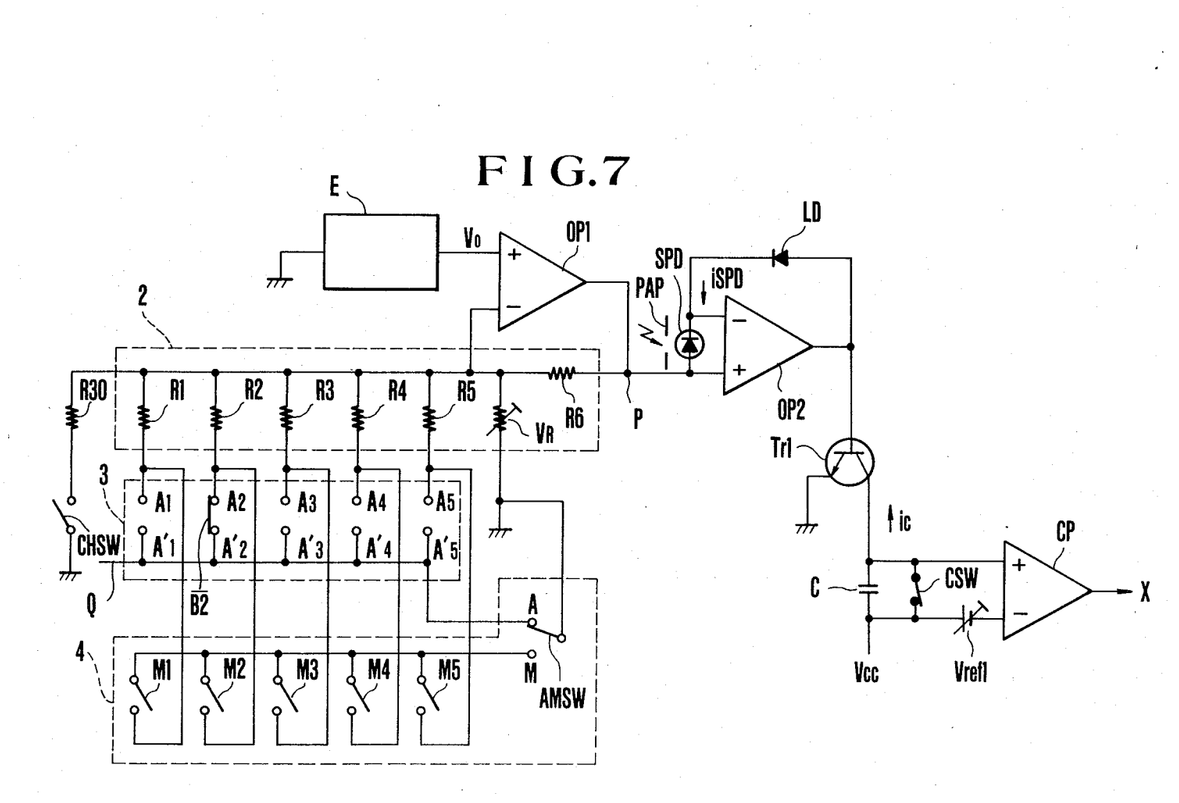
FIG. 7 is a circuit diagram showing an exposure control device of a camera arranged according to the invention as a further embodiment thereof.

In view of this, another embodiment is arranged as shown in FIG. 7 to be capable of ensuring an adequate exposure even in the case of a taking lens of variable focal length. Referring to FIG. 7, when the focal length of a taking lens (not shown) is shifted from a long focal length (telephoto side) to a short focal length, a normally-open type switch CHSW which is arranged to be responsive to the movement of the taking lens closes to parallel connect to a resistance network 2, a resistor R30 which is of a resistance value corresponding to a difference between one focal length and another of the taking lens. Therefore, a capacitor C is rapidly charged. The shutter blades (not shown) are closed quicker than in the case of the long focal length and thus gives an adequate exposure. Further, in FIG. 7, the elements performing the same functions as the corresponding elements of FIG. 2 are indicated by the same reference numerals and symbols and description of their functions is omitted here.

Further, the foregoing description of embodiments is based on the assumption that the shutter blades are arranged to perform combined functions as a diaphragm and a shutter. However, this invention is not limited to the cameras of that kind but is of course also applicable to cameras of the kinds having a diaphragm arranged separately from a shutter. It goes without saying that, in the event of such application, a known trailing shutter blade is arranged to be caused to travel to close the shutter by a signal produced from the comparator CP.

TABLE

| ISO film sensitivity | | | Electrode position | | | | |
| --- | --- | --- | --- | --- | --- | --- | --- |
| Value index | Reduced value | Step number index | B1 | B2 | B3 | B4 | B5 |
| | | | 1 | 2 | 4 | ⅓ | ⅔ |
| 25 | $25 \times 2^0$ | 0 | | | | | |
| 32 | $25 \times 2^{\frac{1}{3}}$ | ⅓ | | | | | |
| 40 | $25 \times 2^{\frac{2}{3}}$ | ⅔ | | | | | |
| 50 | $25 \times 2^1$ | 1 | | | | | |
| 64 | $25 \times 2^{1\frac{1}{3}}$ | 1⅓ | | | | | |
| 80 | $25 \times 2^{1\frac{2}{3}}$ | 2⅔ | | | | | |
| 100 | $25 \times 2^2$ | 2 | | | | | |
| 125 | $25 \times 2^{2\frac{1}{3}}$ | 2⅓ | | | | | |
| 160 | $25 \times 2^{2\frac{2}{3}}$ | 2⅔ | | | | | |
| 200 | $25 \times 2^3$ | 3 | | | | | |
| 250 | $25 \times 2^{3\frac{1}{3}}$ | 3⅓ | | | | | |
| 320 | $25 \times 2^{3\frac{2}{3}}$ | 3⅔ | | | | | |
| 400 | $25 \times 2^4$ | 4 | | | | | |
| 500 | $25 \times 2^{4\frac{1}{3}}$ | 4⅓ | | | | | |
| 640 | $25 \times 2^{4\frac{2}{3}}$ | 4⅔ | | | | | |
| 800 | $25 \times 2^5$ | 5 | | | | | |
| 1000 | $25 \times 2^{5\frac{1}{3}}$ | 5⅓ | | | | | |
| 1250 | $25 \times 2^{5\frac{2}{3}}$ | 5⅔ | | | | | |
| 1600 | $25 \times 2^6$ | 6 | | | | | |
| 2000 | $25 \times 2^{6\frac{1}{3}}$ | 6⅓ | | | | | |
| 2500 | $25 \times 2^{6\frac{2}{3}}$ | 6⅔ | | | | | |
| 3200 | $25 \times 2^7$ | 7 | | | | | |
| 4000 | $25 \times 2^{7\frac{1}{3}}$ | 7⅓ | | | | | |
| 5000 | $25 \times 2^{7\frac{2}{3}}$ | 7⅔ | | | | | |

What I claim:

1. An exposure control device for a photographic camera having a shutter comprising:
   (a) means for producing a digital signal in accordance with a code signal representative of a film sensitivity on a film cartridge;
   (b) means for converting the digital signal from said digital signal producing means to an analog signal corresponding to the digital signal;
   (c) means for producing a voltage proportional to absolute temperature;
   (d) first amplifying means having a first input terminal to receive the analog signal from said converting means, a second input terminal to receive the voltage from said voltage producing means and an output terminal;
   (e) feedback impedance means connected between the first input terminal and the output terminal of said first amplifying means, whereby said first amplifying means producing a voltage corresponding to the analog signal;
   (f) light sensitive means disposed to receive the light from an object to be photographed;
   (g) second amplifying means arranged to receive the voltage from said first amplifying means and for amplifying the output from said light sensitive means;
   (h) impedance means connected to a feedback path of said second amplifying means for logarithmically compressing the output from said light sensitive means;
   (i) variable impedance means connected to an output terminal of said second amplifying means and for expanding the output from said second amplifying means into the inverse-logarithmic output;
   (j) integrating capacitor means for integrating an output from said variable impedance means in accordance with the opening operation of said shutter; and
   (k) shutter triggering means for closing said shutter when the voltage accross said integrating capacitor means reaches a predetermined value.

2. An exposure control device according to claim 1, wherein said variable impedance means includes a base connected to the output terminal of said second amplifying means, an emitter connected to a ground and a collector connected to said integrating capacitor.

3. An exposure control device according to claim 1, wherein said first and said second amplifying means include an operational amplifier respectively.

4. An exposure control device according to claim 3, wherein said impedance means includes a diode connected to a feedback path of said operational amplifier.

5. An exposure control device according to claim 1, further comprising:
   (a) detecting means responsive to the code signal representative of the film sensitivity on the film cartridge and for producing a driving signal when a film cartridge having no code signal is attached to the photographic camera;
   (b) an annunciator; and
   (c) driving means connected to said detecting means for energizing said annunciator in response to said driving signal from said detecting means.

6. An exposure control device according to claim 1, further comprising:
   manual setting means for producing a digital signal in accordance with a manually set film sensitivity, said manual setting means connected in parallel to said digital signal producing means.

7. An exposure control device according to claim 6, further comprising:
   selecting means for selectively connecting the digital signal producing means and the manual setting means to the converting means.

8. An exposure control device for a photographic camera having a shutter, comprising:
   (a) means for producing a digital signal in accordance with a code signal representative of a film sensitivity on a film cartridge;
   (b) means for converting the digital signal from said digital signal producing means to an analog signal corresponding to the digital signal;
   (c) means for producing a voltage proportional to absolute temperature;
   (d) first amplifying means having a first input terminal to receive the analog signal from said converting means, a second input terminal to receive the voltage from said voltage producing means and an output terminal;
   (e) feedback impedance means connected between the first input terminal and the output terminal of said first amplifying means, whereby said first amplifying means producing a voltage corresponding to the analog signal;
   (f) light sensitive means disposed to receive the light from an object to be photographed;
   (g) second amplifying means arranged to receive the voltage from said first amplifying means and for amplifying the output from said light sensitive means;
   (h) impedance means connected to a feedback path of said second amplifying means for logarithmically compressing the output from said light sensitive means;
   (i) variable impedance means connected to an output terminal of said second amplifying means and for expanding the output from said second amplifying means into the inverse-logarithmic output; and (j) means responsive to the opening operation of said shutter and for closing said shutter when an amount of the output from said variable impedance means reaches a predetermined value.

9. An exposure control device according to claim 8, further comprising:

supplying means connected to said first amplifying means to supply to the first input terminal of said first amplifying means an analog signal which corresponds to a focal length of the taking lens of the photographic camera.

* * * * *